Figure 1:
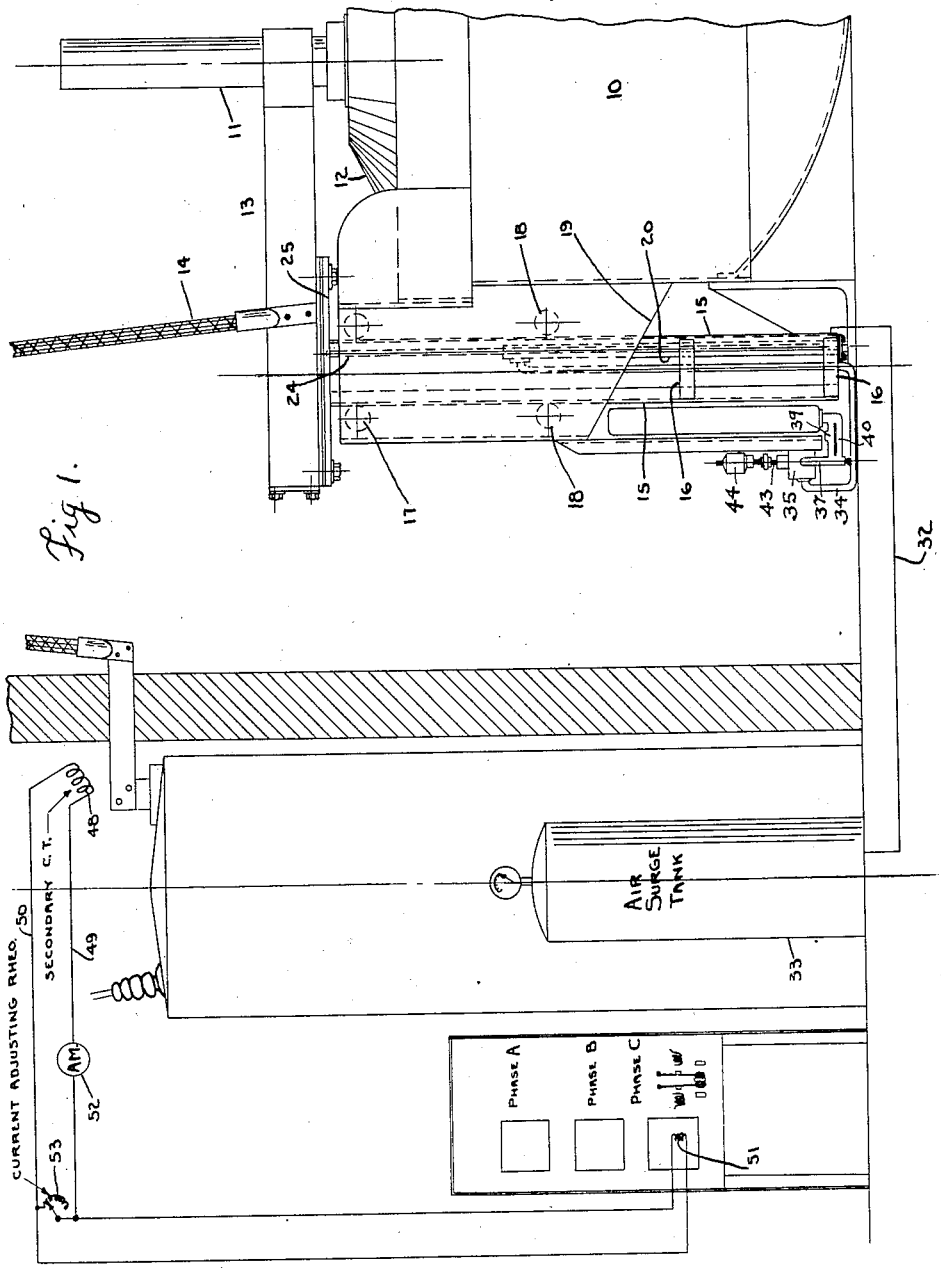

Sept. 22, 1942.    W. H. PAYNE    2,296,734
MEANS FOR AUTOMATICALLY CONTROLLING THE ELECTRODES OF ARC FURNACES
Filed Jan. 25, 1941    2 Sheets-Sheet 1

INVENTOR.
William Harvey Payne
BY Banning & Banning
Attorneys.

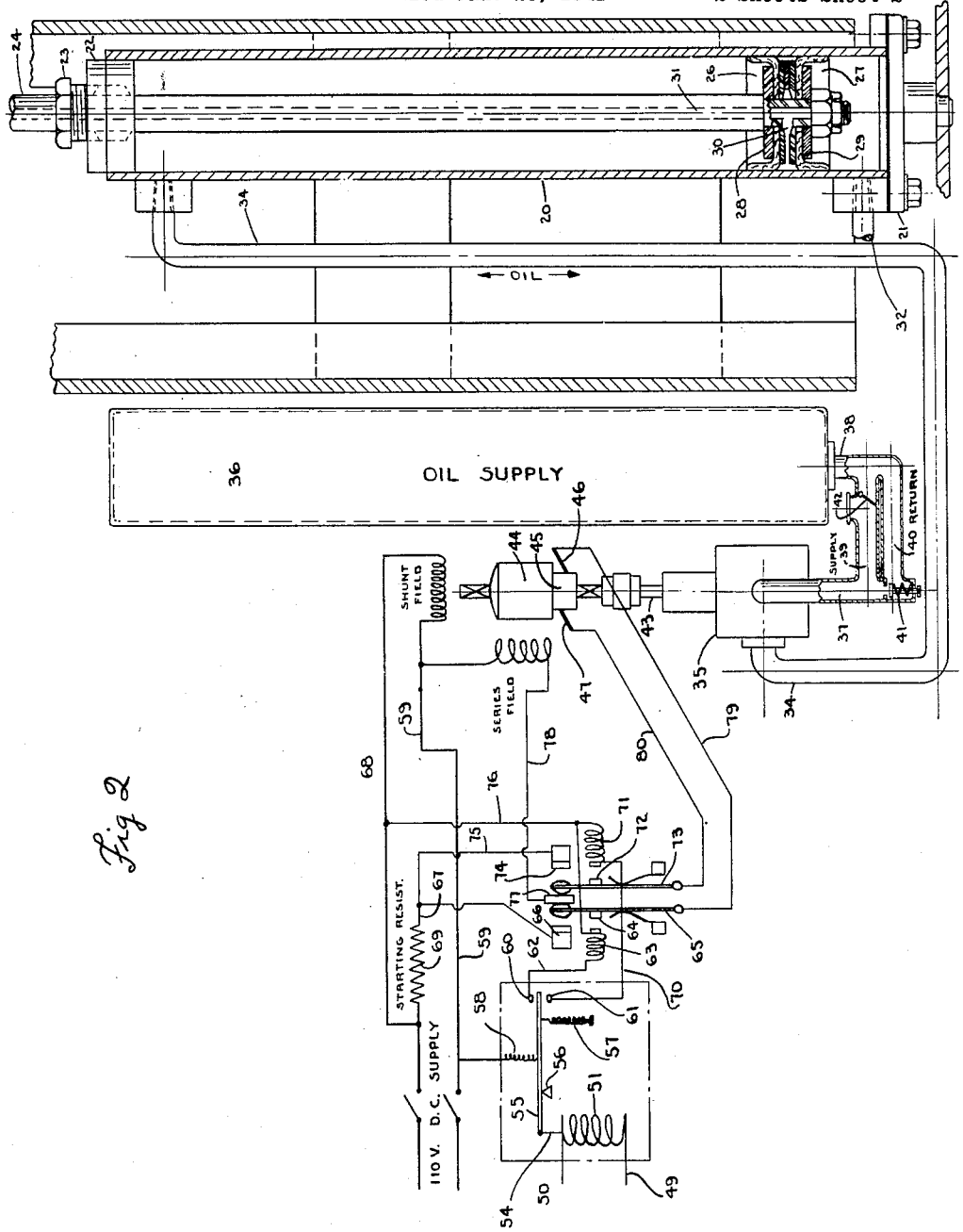

Patented Sept. 22, 1942

2,296,734

UNITED STATES PATENT OFFICE 2,296,734

MEANS FOR AUTOMATICALLY CONTROLLING THE ELECTRODES OF ARC FURNACES

William Harvey Payne, La Grange, Ill.

Application January 25, 1941, Serial No. 375,990

5 Claims. (Cl. 13—13)

This invention relates to a simple, rugged and efficient type of mechanism for controlling the movements of the electrodes of an arc furnace wherein each of the electrodes is individually raised and lowered in conformity with the flow of electric current therethrough, in order, insofar as possible, to maintain a spark gap of predetermined length with a corresponding uniformity in the current flow.

In the operation of an electric furnace employed for the melting down of scrap or like irregular bodies or lumps of metal, the material presents broken or irregular contact surfaces which constitute the poles for the electrodes and the form and elevation of these surfaces, and hence their distance from the electrodes is constantly changing as the material melts down into a liquid body. It is thus evident that provision must be made for instantaneously and rapidly regulating the positions of the respective electrodes in conformity with these changes in a mass of metal and in order that a uniform spark gap may be maintained between the electrode and the closest point in the mass of metal contiguous thereto and which for the time being constitutes the spark pole for the electrode.

At the beginning of the melting operation the cold scrap will present points or projections from which the arc is established, and as the melting proceeds the arc from each electrode will melt its hole or cavity through the scrap, and in these circumstances it is necessary for the electrode to follow the receding metal which normally melts down very rapidly. Molten metal from the holes through the scrap charge collects on the furnace bottom, so that within about fifteen per cent (15%) of the total melting time the electrodes pass through the cold charge and arc to the pool of molten metal and slag thus formed on the furnace hearth, and from that time on to the completion of the melting of the scrap, this electric furnace heat is put in underneath the remainder of the charge which bridges over the cavity thus formed. Finally, this bridged over scrap falls in, and large sections of it may fall against one or more of the electrodes, thereby causing substantially short circuits and surging therefrom. These changes radically alter the arcing conditions within the furnace, so that quick adjusting movements of electrodes are necessary in order to maintain each electrode at the intended arcing distance, especially where the scrap falls in from above.

The need for instant and accurate adjustments of the electrodes is felt particularly in furnaces employed in the making of low carbon, stainless steel, in which the lowest possible pickup of carbon is of essential importance, and improvements in the accuracy and sensitivity of the electrode control system is of great importance in this art.

In the effort to maintain uniformity in the arcing distance for each electrode, difficulty has heretofore been experienced in devising control mechanism which shall be instantly responsive to changing conditions and which at the same time is so designed as to quickly and accurately move the associated electrode to the required degree to reestablish the intended arcing distance, without, however, overruning the mark as a result of the inertia of the moving parts, and in an effort to overcome such difficulties, resort has been had to various means for damping the movements, which, however, have resulted in sluggishness of response or inaccuracy in the control of the required movements.

In the effort to provide for a prompt and accurate adjustment of the electrodes, resort has been had to the use of steel cables carried around a drum actuated by a reversible motor, but tests have shown that the flexibility of such a cable results in delays of as much as one second of time in the effective application of reversing movements, and that a delay of this extent produces deleterious results in the operation of the furnace, particularly when melting low carbon stainless steel today.

Resort has also been had to the use of rack and pinion means for transmitting the reversing movements of the electrode arm, but the use of such devices has proven unsatisfactory by reason of the accumulation of dirt and grit, and other operating difficulties.

Resort has also been had to the use of hydraulic means controlled by the operation of valves of a more or less complicated character, but difficulty has ordinarily been experienced in the instantaneous effective operation of valve mechanism by reason of the fact that valves, when closed, must overlap the margins of the ports which they control, so that, unless provision is made for the instant elimination of the overlap, the effective operation of the valve will be delayed, with a resulting delay in the adjustment of the electrode.

The present invention is designed to overcome the difficulties above set forth by the employment of a reversible motor which is instantly responsive to variations in the spark gap, and which is directly connected to pump mechanism adapted to control the direction of flow of a practically incompressible and nonexpansible liquid which is employed to directly and promptly regulate the movements of the electrode arm, without, however, necessitating the use of a complicated or involved system of valves for controlling the direction of flow of the liquid.

It is realized that such a method of operation may be variously employed either with or without the conjoint use of means for counterbalancing the weight of the electrode arm and the electrode carried thereby, but it is not the intention in claiming the broader aspects of the present invention to limit its use in conjunction with such a counterbalancing system, which is employed primarily for the purpose of reducing the degree of pressure required in effecting the movements of the electrode without altering the principle of operation involved.

In its more limited aspects, however, and in the form presently to be described, the means for applying liquid pressure and directing the flow thereof are employed in conjunction with the application of gaseous lifting pressure, which serves as a counterbalancing medium and as the means for positively lifting the electrode when unopposed by a superior liquid pressure the flow of which is controlled in both directions by the operation of the reversible motor.

The invention in the preferred form shown employs a gaseous liquid, preferably a trapped body of air constantly under pressure sufficient not only to counterbalance the weight of the electrode and the associated moving parts, but also to exert a positive lifting pressure, which is utilized in cooperation with a noncompressible liquid as the exact electrode actuating means, said liquid, such as oil, being applied against the up-push of the counterbalancing air, in force to lower an electrode, and held in non-changing volume against the up-push of the air to make an electrode stand still, and decreased in the volume opposing the up-push of the air, to allow the excess air to raise the electrode, as occasion requires, under the control of liquid means such as oil, which is capable of exerting sufficient pressure to overcome the excess lifting pressure of the gaseous fluid when it is desired to lower the electrode or to release the liquid pressure when it is desired to raise the electrode.

The present invention is particularly directed to the employment of a reversible electric motor and pumping mechanism for directing the flow of liquid, without the necessity for the employment of a complicated or involved valve system, with the parts so related that a reversal of the oil flow will occur promptly upon a reversal in the direction of rotation of the motor, which is immediately responsive to variations in the current supplied to the electrode whether such variations be in the amperage or voltage, or in a combination of these factors, depending upon the nature of the responsive element employed to control the operations of the motor.

The apparatus is also designed to effect desired adjustments of the electrode by the expenditure of a relatively small application of power, since the gaseous fluid pressure up-push against the electrode arm weight affords a lifting medium of negligible inertia, and it is only necessary in order to effect a lowering adjustment to supply a sufficient liquid counter-pressure, plus electrode arm weight, to overcome the excess up-push of the air.

Further objects and details will appear from the description of the invention in conjunction with the accompanying drawings, wherein—

Figure 1 is a side view of a portion of an electric furnace showing the general arrangement of the electrode controlling mechanism of the present invention partly in section; and Fig. 2 is an enlarged sectional view of the air and oil cylinder and piston with the associated oil pump and oil supply equipment with the motor and control circuit shown in diagrammatic relation.

In a furnace of the type here involved it is customary to employ three electrodes with the associated control mechanism, but since these mechanisms are identical in each instance, it suffices to give a full description of only one.

The mechanism is employed in connection with an arc furnace 10 having electrodes 11 (one being shown) which extend vertically through the roof or cover 12 of the furnace. Each of the electrodes is carried at the end of an overhanging arm 13 and is supplied with current through a conductor cable 14 leading to and through the arm of the electrode. The arm, as shown, is mounted upon a vertically movable frame comprising vertically disposed channel bars 15 connected at suitable intervals by cross bars 16 to afford a vertically elongated open frame.

The frame is guided between upper and lower sets of rollers 17 and 18, which serve to guide the frame and prevent the overhanging arm from sagging. The rollers are mounted within a fixed frame comprising spaced plates 19 outwardly extending from the wall of the furnace.

The vertically movable frame encloses a cylinder 20 which rests upon and is closed at its lower end by a base plate 21 elevated slightly above the floor. The upper end of the cylinder is closed by a cap plug 22 provided with a gland 23 through which extends a piston rod 24 which projects upwardly into contact with a plate 25 which forms the base for the electrode arm 13.

The arrangement is one which serves to raise and lower the electrode arm and associated parts by the movements of the piston rod, which is provided at its lower end with a double piston consisting of an upper section 26 and a lower section 27 held in spaced relation to one another by suitable disks 28 and 29, a space or gap 30 being afforded between the pistons, which communicates with a port 31 extending through the piston rod, so that, if there is any leakage of air or oil past the upper and lower pistons, it will find escape through the piston rod, which prevents any intermingling of the fluid mediums on opposite sides of the piston.

In order to afford the necessary lifting pressure which at all times is somewhat in excess of that required to counterbalance the weight of the electrode arm, the electrode and associated parts, the lower end of the cylinder is constantly supplied with air under pressure which is admitted through a duct 32 leading to a constantly closed air surge tank 33 which is of sufficient volume to compensate against slight variations in the maintained pressure occasioned by the rise and fall of the piston. Unless counteracted, therefore, the air pressure will elevate the electrode, and this force is relied upon in the making of adjustments which require the elevation of the electrode.

The superior counter-pressure employed in the lowering of the electrode is afforded by a liquid, preferably oil, which is supplied to the upper end of the cylinder through an oil duct 34 which leads to a pump 35, which may be a gear pump or other pump of suitable type. The pump is also connected with the base of an oil supply tank 36 through a header pipe 37, which is connected with a pipe section 38 through the medium of an oil supply channel 39 and an oil return channel 40. The flow to the tank, through the oil return channel 40, is controlled by a spring backed valve 41 at the entrance to the return channel 40, while the flow from the tank is controlled by a check valve 42 in the supply channel 39, so that, when the pump is rotated in the proper direction to withdraw oil from the tank 36, the oil flow will be directed through the supply channel 39, header pipe 37, pump 35, and oil duct 34, to the top of the cylinder, which oil pressure is superior to the lifting pressure exerted against the under side of the piston, so that the lifting effect will be overcome and the electrode will be lowered.

On the contrary, when the pump is rotated in the reverse direction, the oil will be withdrawn from the top of the cylinder through the duct 34, pump 35, and header 37, past the valve 41 and through the return channel 40 to the oil tank, thereby reducing the pressure on the upper side of the piston and allowing the air pressure from below to lift the electrode. When the pump is inactive, the pressure of the spring backed valve 41 will be substantially equal to the lifting pressure exerted by the air piston, so that the oil will be trapped against return to the tank 36, which will balance the piston and hold the electrode stationary.

The pump 35 is operated directly by the shaft 43 of a reversing motor 44 having an armature 45 contacted by brushes 46 and 47. The direction of rotation of the motor is controlled by variations in current flow above or below the intended conditions, with the result that when the electrode stands in proper relation to afford the desired spark gap, the motor will be inactive under the action of the control mechanism now to be described.

The current flow to the electrode induces a current through the secondary coil 48 of a control circuit comprising wires 49 and 50 leading to a solenoid coil 51. The control circuit includes an ammeter 52 and a current adjusting rheostat 53 which permits the current flow through the coil 51 to be regulated in this standard part of the circuit in any desired reasonable ratio to the strength of the current supplied to the electrode. The coil 51 surrounds the armature 54 of an ammeter lever 55, which is fulcrummed at 56 and is held under the opposition tension of a spring 57.

The motor is supplied through relay circuits now to be described: The ammeter lever is connected through a wire 58 with line wire 59. The opposite end of the ammeter lever is normally held in intermediate position, between contacts 60 and 61, in its neutral position when the pull occasioned by the induced current flow through the solenoid 51 is balanced by the pull of the spring 57.

The contact 60 is connected by a wire 62 to the solenoid 63, which acts upon the armature 64 of a spring backed switch 65, which when drawn back makes engagement with a contact 66 in circuit with the line wire 67 in a shunt circuit 68 which includes a starting resistance 69. The contact 61 is connected by a wire 70 with a solenoid 71 adapted to retract the armature 72 of a spring backed switch 73 which is adapted to engage with a contact 74 connected by a wire 75 with the line wire 67. Both of the solenoids 63 and 71 are connected through a wire 76 with the wires 68 of the shunt circuit.

When the switches 65 and 73 stand in neutral position they engage a contact 77 which is in circuit with the line wire 59 through a wire 78. The brushes 46 and 47 connect with the switches 65 and 73 respectively, through wires 79 and 80.

When the current flow through the solenoid 51 increases, due to increased current flow through the electrode (or increased voltage as the case may be), the armature 54 of the ammeter lever 55 will be drawn down, and the opposite end of the lever elevated into engagement with the contact 60, which establishes a current flow from the line wire 68, through wire 76 to solenoid 63, wire 62, contact 60, ammeter lever 55, wire 58, to line wire 59. The closing of this circuit draws the switch 65 into engagement with the contact 66, thereby closing the circuit through the line wire 67, contact 66, switch 65, wire 79, brush 46, motor armature 45, brush 47, wire 80, switch 73, contact 77, wire 78 and motor series field, to the line wire 59. This current flow causes rotation of the motor in one direction. It is understood that the shunt field of the reversing motor is on all of the time that the equipment is in operation.

A reverse rotation is similarly established when a closed circuit is established through the solenoid 71, which draws back the switch 73 into engagement with the contact 74, thereby establishing a motor circuit from the line wire 67, through wire 75, contact 74, switch 73, wire 80, brush 47, motor armature 45, in the reverse direction, brush 46, wire 79, switch 65, contact 77, wire 78 and series field, back to line wire 59.

It will thus be seen that the movement of the ammeter lever 55 in either direction away from its neutral balanced position establishes a current flow through the motor in the desired direction to operate the oil pump either to supply oil to the upper end of the cylinder for lowering of the electrode, or, under reverse conditions, for withdrawing oil from the cylinder to permit the air pressure from below to elevate the electrode.

The raising and lowering of the electrode will be initiated promptly when variations in the current conditions in the electrode circuit occur which require correction, since such variations will be instantly reflected by a movement of the contact making ammeter lever and the closing of the appropriate circuit to effect a corresponding closure of the motor circuit to provide for a current flow in the proper direction to properly actuate the motor and the oil pump in train therewith.

It is necessary only to supply sufficient oil pressure plus arm weight to overcome the excess lifting effect of the up-push air when the electrode requires lowering, and to overcome the pressure of the spring backed valve 41 when it is necessary to force the oil back into the oil tank in the withdrawing of oil from the upper end of the cylinder, so that a motor and pump of relatively small capacity will suffice to provide for the necessary adjustments of the electrode.

The reversal of the current flow to the motor will occur instantly in response to variations in conditions requiring correction, which is of utmost importance in mechanism of this character in which prompt action rather than speed is of primary importance.

The mechanism in combination is of simple low inertia construction. It avoids the use of valve mechanism and appliances for the regulation of the valve movements while at the same time using hydraulic means for transmitting the actuating power from the reversing motor prime mover. The only valves employed per unit are the check valve 42 and the spring backed valve 41, which respond instantly to the oil under the impetus of the pump in train with the reversing motor. This reversing motor and directly connected gear type pump for electrode arm positioning are of lower inertia than conventional single and double worm reduction units with cable drives as are used today. Those skilled in the art realize immediately that the pump actuating unit is a more efficient prime mover than singe or double worm cable drive units. Single worm reduction units operate at approximately 50 to 60% mechanical efficiency, and double worm reduction units operate at approximately 25 to 30% efficiency in their best forms. The motor driven pump unit operates at about 85% mechanical efficiency. The motor and pump in train prime mover therefore will allow the use of a smaller motor with correspondingly lower inertia than similar drives in use today.

It will be understood that the particular control mechanism herein shown and the circuits employed serve merely for purposes of illustrating the principles of the present invention, and that it is not the intention to limit the claims to control devices of any specific character, since the principal features of the present invention reside in the employment of a suitably controlled reversible motor and pump mechanism adapted to supply or withdraw a liquid medium such as oil for the purpose of regulating the movements of the electrode.

It will also be understood that although I prefer to employ air under compression as the lifting medium for the electrode and associated parts, the principal features of this invention may be employed under circumstances in which the lifting effect is produced by a counterweight, or in which a liquid medium is otherwise utilized in the raising and lowering of the electrode, since the invention, in its broader aspects, is directed primarily to the employment of an easily controlled reversing prime mover, which directly actuates the electrode through the medium of a substantially incompressible and nonexpansible liquid, so that a reversal of the motor will be instantly reflected in a corresponding movement of the electrode.

I claim:

1. In an electric arc melting furnace having an arcing electrode and a vertically movable arm carrying the electrode and supplying heating current thereto, means for maintaining gaseous medium under pressure in a cylinder and against a piston engaged with the arm and in excess of the weight of the arm and the electrode carried thereby to effect a lifting of the electrode when said lifting pressure is unimpeded, a member engaged with the arm and adapted to be acted upon by liquid under pressure against the opposite side of the piston and in sufficient degree to counteract the lifting pressure to effect a downward movement of the arm and electrode, said means including a reversible pump and connections for forcing forward or withdrawing the liquid medium as the case may be, a reversible electric motor in train with the pump and spark-gap-variation actuated means for controlling the direction of flow of the current to the electric motor in response to variations in the current flow through the electrode which require readjustment of the electrode.

2. In an electric arc melting furnace having an arcing electrode and a vertically movable arm carrying the electrode and supplying heating current thereto, a cylinder and piston acting against the arm and means for maintaining a gaseous medium under pressure in the cylinder and against the piston and in excess of the weight of the arm and the electrode carried thereby to effect a lifting of the electrode when said lifting pressure is unimpeded, means for applying liquid under pressure against the opposite side of the piston and in sufficient degree to counteract the lifting pressure to effect a downward movement of the arm and electrode, said means including a reversible liquid pump and a duct leading from the pump to the cylinder, a liquid supply tank and supply and return passages between the pump and the supply tank, the supply passage being provided with a check valve and the return passage being provided with a spring backed valve adapted to yield under pressure in excess of the gaseous lifting pressure exerted against the piston, the supply passage permitting the flow of liquid from the tank through the pump and to the cylinder and preventing a return flow when the pump is actuated in one direction and the return passage permitting a return flow of liquid to the supply tank when the pump is actuated in the reverse direction, a reversible motor in train with the pump, and spark-gap-variation actuated means and connections for controlling the direction of movement of the motor to adjust the electrode in the required direction responsively to abnormal current flow to the electrode.

3. In an electric arc melting furnace having an arcing electrode and a vertically movable arm carrying the electrode, means for supplying heating current thereto, piston means and a connection engaging said arm, means for maintaining a gaseous medium under pressure in a cylinder and against said piston means to act against the weight of the arm and the electrode carried thereby, means for admitting or withdrawing liquid under pressure against the piston means, and in sufficient degree when admitted to impart a positive movement to the arm and electrode, said means including a reversible pump and connections for forcing forward or withdrawing the liquid medium as the case may be, reversible power applying means in train with the pump, and spark-gap-variation actuated means for controlling the direction of movement of the power applying means in response to variations in the current flow through the electrode which require readjustment of the electrode.

4. In an electric arc melting furnace having an arcing electrode and a vertically movable arm carrying the electrode and means for supplying heating current thereto, a piston engaged with the arm, means for maintaining a gaseous medium under pressure in a cylinder and against said piston to afford a movement of the electrode in one direction when said gaseous pressure is unimpeded, means for admitting liquid under pressure against the opposite side of the piston and in sufficient degree to counteract the gaseous pressure and effect a movement of the arm and electrode in the opposite direction, said means including a reversible pump and connections for forcing forward or withdrawing the liquid medium as the case may be, reversible power applying means in train with the pump, and spark-gap-variation actuated means for controlling the direction of movement of the power applying means in response to variations in the current flow through the electrode which require readjustment of the electrode.

5. In an electric arc melting furnace having an arcing electrode and a vertically movable arm carrying the electrode and means for supplying heating current to the electrode, a cylinder and piston acting against the arm, means for maintaining a gaseous medium under pressure in the cylinder and against the piston to afford a movement in one direction to the electrode when said pressure is unimpeded, means for applying liquid under pressure against the opposite side of the piston and in sufficient degree to counteract the gaseous pressure to effect a movement of the arm and electrode in the opposite direction, said means including a reversible liquid pump and a duct leading from the pump to the cylinder, a liquid supply tank and supply and return passages between the pump and the supply tank, the supply passage being provided with a check valve, and the return passage being provided with a spring backed valve adapted to yield under pressure in excess of the gaseous pressure exerted against the piston, the supply passage permitting the flow of liquid from the tank through the pump and to the cylinder and preventing a return flow when the pump is actuated in one direction, and the return passage permitting a return flow of the liquid to the supply tank when the pump is actuated in the reverse direction, reversible power applying means in train with the pump, and spark-gap-variation actuated means and connections for controlling the direction of movement of the power applying means to adjust the electrode in the required direction responsively to abnormal current flow to the electrode.

WILLIAM HARVEY PAYNE.